(12) United States Patent
Chen et al.

(10) Patent No.: US 8,272,104 B2
(45) Date of Patent: Sep. 25, 2012

(54) HINGE-SLIDE COVER MOUNTING STRUCTURE USING A SHEET METAL BRACKET MECHANISM

(75) Inventors: Chia Hui Chen, Taoyuan (TW); Che-Hsien Lin, Taoyuan (TW)

(73) Assignee: Lianhong Art Co., Ltd., Taoyuan (TW)

( * ) Notice: Subject to any disclaimer, the term of this patent is extended or adjusted under 35 U.S.C. 154(b) by 90 days.

(21) Appl. No.: 13/035,121

(22) Filed: Feb. 25, 2011

(65) Prior Publication Data
US 2012/0217855 A1 Aug. 30, 2012

(51) Int. Cl.
E05D 7/00 (2006.01)
E05D 3/06 (2006.01)

(52) U.S. Cl. .................. 16/354; 16/366; 16/357; 16/327

(58) Field of Classification Search .................... 16/327, 16/331, 333, 338, 340, 366, 354, 357, 360, 16/346, 345, 368, 369; 361/679.08, 679.11, 361/679.02, 679.15, 679.27, 679.21, 679.09, 361/679.22; 455/90.3, 575.1, 575.3, 575.8; 379/433.12, 433.13; 348/373, 333.01, 333.06, 348/794; 248/274.1, 284.1, 286.1, 287.1, 248/419, 420
See application file for complete search history.

(56) References Cited

U.S. PATENT DOCUMENTS

| | | | | |
|---|---|---|---|---|
| 4,146,320 A * | 3/1979 | Schrader | ........................ | 396/145 |
| 5,102,084 A * | 4/1992 | Park | ........................... | 248/286.1 |
| 5,168,426 A * | 12/1992 | Hoving et al. | ........... | 361/679.09 |
| 5,548,478 A * | 8/1996 | Kumar et al. | ........... | 361/679.27 |
| 6,091,600 A * | 7/2000 | Jeong | ........................ | 361/679.12 |
| 6,163,451 A * | 12/2000 | Chiu | ........................ | 361/679.22 |
| 6,247,242 B1 * | 6/2001 | Sujino | .............................. | 33/706 |
| 6,748,249 B1 * | 6/2004 | Eromaki et al. | ........... | 455/575.4 |
| 7,677,509 B2 * | 3/2010 | Jang | ............................ | 248/176.1 |
| 2005/0078818 A1 * | 4/2005 | Bae | ........................... | 379/433.13 |
| 2005/0225934 A1 * | 10/2005 | Homer et al. | ................. | 361/683 |
| 2007/0180657 A1 * | 8/2007 | Zeilbeck et al. | ................ | 16/354 |
| 2010/0027224 A1 * | 2/2010 | Wang et al. | .................... | 361/728 |
| 2010/0299873 A1 * | 12/2010 | Song | ............................... | 16/236 |
| 2011/0216483 A1 * | 9/2011 | Vesely | ...................... | 361/679.01 |
| 2012/0175478 A1 * | 7/2012 | Chen et al. | .................. | 248/286.1 |

FOREIGN PATENT DOCUMENTS

| | | | | |
|---|---|---|---|---|
| CN | 201716622 U | * | 1/2011 | |
| JP | 07208046 A | * | 8/1995 | |
| JP | 09188203 A | * | 7/1997 | |
| JP | 2004029953 A | * | 1/2004 | |
| JP | 2007206283 A | * | 8/2007 | |

\* cited by examiner

*Primary Examiner* — Chuck Y. Mah
(74) *Attorney, Agent, or Firm* — Guice Patents PLLC

(57) ABSTRACT

A liftable slide cover mounting structure consisting of two hinges, two metal sheet bracket mechanism, two sliding rails, two gears, two gear racks and two supplementary support mechanisms. Subject to the use of the sheet plate bracket mechanisms to hold the sliding rails instead of zinc alloy sliding rail holders, the weight of the liftable slide cover mounting structure is minimized. Further, when the cover panel is opened from the base member, the sheet plate bracket mechanisms are forced into engagement with the supplementary support mechanisms to support the cover panel in position for enabling the user to operate the display screen of the cover panel positively.

5 Claims, 9 Drawing Sheets

HINGE-SLIDE COVER MOUNTING STRUCTURE USING A SHEET METAL BRACKET MECHANISM

BACKGROUND OF THE INVENTION

1. Field of the Invention

The present invention relates to slide cover mounting technology and more particularly, to a liftable slide cover mounting structure for use in an electronic device, for example, tablet computer, which using a sheet metal bracket mechanism to hold sliding rails instead of zinc alloy sliding rail holders, minimizing the weight.

2. Description of the Related Art

Following development and function improvement of touch control technology, tablet computer has become popular. The LCD screen of a tablet computer is located on the outer surface of the computer for convenient operation.

However, the use of a keyboard is a common practice to most people for, for example, text word input. There are tablet computers that comprise an operating system end arranged at the bottom side of the LCD display panel. Thus, the LCD display panel can be moved horizontally relative to the operating system end and then lifted to a tilted position so that the user can use the keyboard on the operating system end.

To satisfy this operation, a special slide cover mounting arrangement is necessary. The known slide cover mounting arrangement comprises a pair of hinges, a pair of sliding rail holders and sliding rails. However, this design does not allow smooth lifting of the LCD display panel. Gear and gear rack may be added to distribute the applied push force evenly. However, the gear will be disengaged from the gear rack when the user lifts the LCD display panel from the operating system end, and will be pushed back into engagement with the gear rack when the user closes the LCD display panel. Because the gear is not constantly kept in mesh with the gear rack, the LCD display panel may be erroneously biased from position.

To eliminate the aforesaid problem, the present inventor invented an improved design, entitled "SLIDE COVER MOUNTING STRUCTURE" under U.S. patent application Ser. No. 12/986,363. According to this design, two gears are pivotally connected between fixed rails on sliding rail holders, and two gear racks are respectively mounted on a cover panel of an electronic device and meshed with the gears. Thus, the cover panel is prohibited from biasing during sliding movement, and can be turned smoothly relative to a base member of the electronic device from a horizontal position to a tilted position.

However, the sliding rail holders are made of zinc alloy, increasing the weight of the slide cover mounting structure. Further, the metal sliding rail holders are kept in contact with the metal sliding rails to cause noises during movement of the metal sliding rails.

Further, tablet computers commonly use a touch panel for operation. Further, a tablet computer should have a stop mechanism to support the cover panel in the opened position for touch operation.

SUMMARY OF THE INVENTION

The present invention has been accomplished under the circumstances in view. It is one object of the present invention to provide a liftable slide cover mounting structure, which uses sheet plate bracket mechanisms to hold sliding rails instead of zinc alloy sliding rail holders, thereby minimizing the weight.

It is another object of the present invention to provide a liftable slide cover mounting structure, which has elongated plastic sliding blocks arranged on sheet plate bracket mechanisms to support metal sliding rails, avoiding noises during sliding motion of the metal sliding rails.

It is another object of the present invention to provide a liftable slide cover mounting structure, which has the common gear shaft of two gears pivotally connected between the sheet plate bracket mechanisms so that the gears are constantly kept in mesh with respective gear racks when opening the cover panel from the base member of the electronic device in which the liftable slide cover mounting structure is installed, enabling the applied force to be distributed to the two opposite lateral sides evenly, avoiding biasing and assuring smooth movement of the cover panel relative to the base member.

It is another object of the present invention to provide a liftable slide cover mounting structure, which uses supplementary support mechanisms to support the hinges on the base member of the electronic device so that when the cover panel is opened from the base member, the sheet plate bracket mechanisms are forced into engagement with the supplementary support mechanisms to support the cover panel in position for enabling the user to operate the display screen of the cover panel positively.

To achieve these and other objects of the present invention, a liftable slide cover mounting structure is used in an electronic device comprising a cover panel and a base member. The liftable slide cover mounting structure comprises two hinges respectively fixedly mounted on a middle part of a top wall of the base member adjacent to two opposite lateral sides thereof, each hinge comprising a rotatable pivot shaft; two sheet plate bracket mechanisms respectively connected to the pivot shafts of the hinges and rotatable upwardly relative to the base member, each sheet plate bracket mechanism comprising a pair of elongated plastic sliding blocks, each elongated plastic sliding block defining a longitudinal sliding groove; two sliding rails bilaterally fixedly mounted on a bottom surface of the cover panel in a parallel manner and respectively slidably coupled to the longitudinal sliding grooves of the elongated plastic sliding blocks of one sheet plate bracket mechanism; a gear shaft pivotally connected between the sheet plate bracket mechanisms; two gears respectively fixedly mounted on the fixed gear shaft adjacent to the sheet plate bracket mechanisms; and two gear racks respectively mounted on the bottom surface of the cover panel in a parallel manner and respectively meshed with the gears. When the cover panel slides forwards relative to the base member to move the sliding rails in the longitudinal sliding grooves of the elongated plastic sliding blocks of the sheet plate bracket mechanisms when receiving a horizontal push force, and at the same time, the gear racks are forced to rotate the gears for enabling the received horizontal push force to be evenly transferred through the gear shafts to the two opposite lateral sides of the base member, avoiding biasing of the cover panel; the gears are kept meshed with the gear racks constantly for enabling the cover panel to be turned about the pivot shafts of the hinges from a horizontal position to a tilted position relative to the base member.

The liftable slide cover mounting structure further comprises two supplementary support mechanisms mounted on the base member to support the hinges on the base member and adapted for engaging the sheet plate bracket mechanisms to hold the cover panel in a tilted position when the cover panel is opened from the base member.

DETAILED DESCRIPTION OF THE PREFERRED EMBODIMENT

Figure 1:
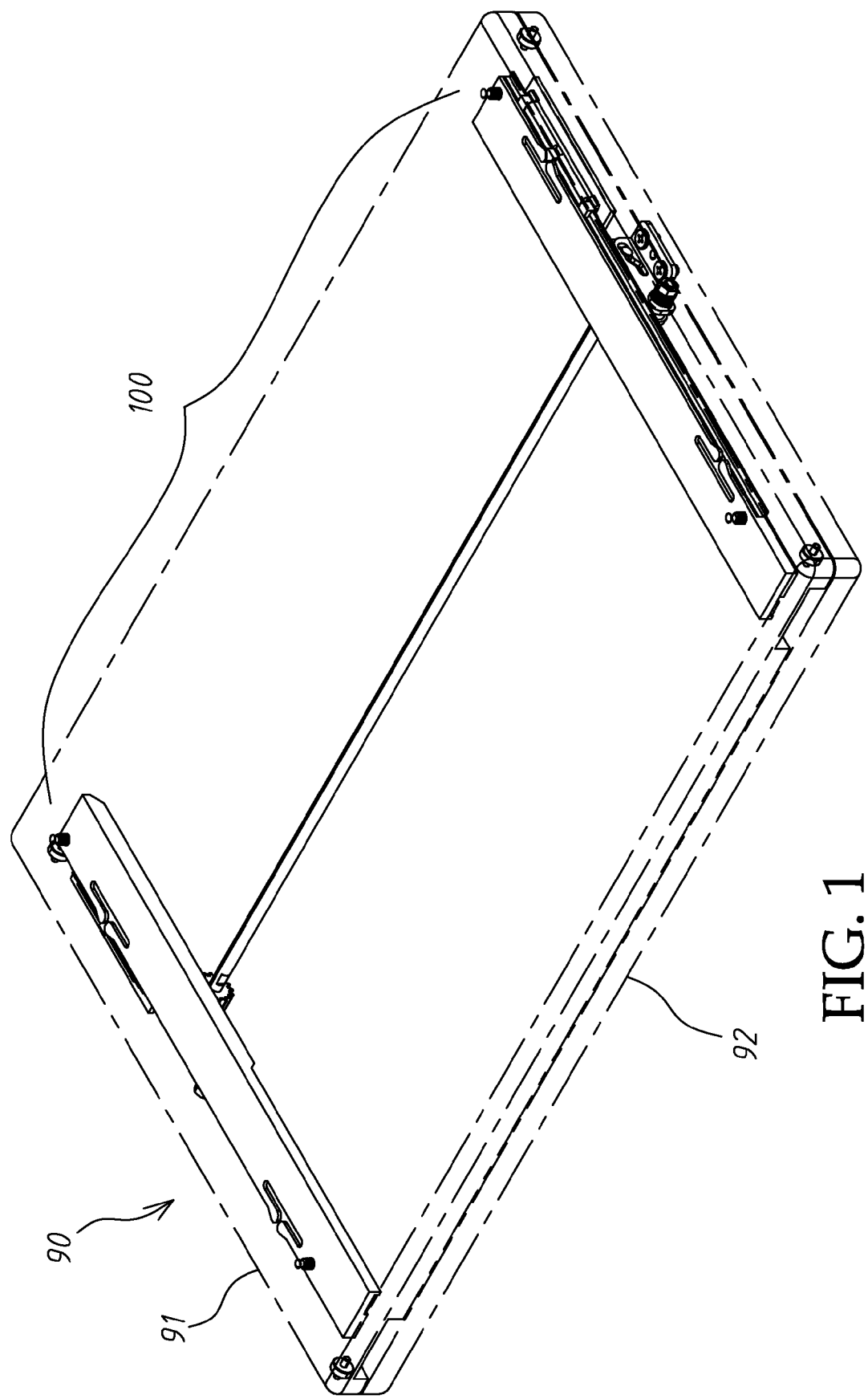
FIG. 1 is a schematic drawing illustrating a liftable slide cover mounting structure used in an electronic device in accordance with the present invention.
Figure 2:
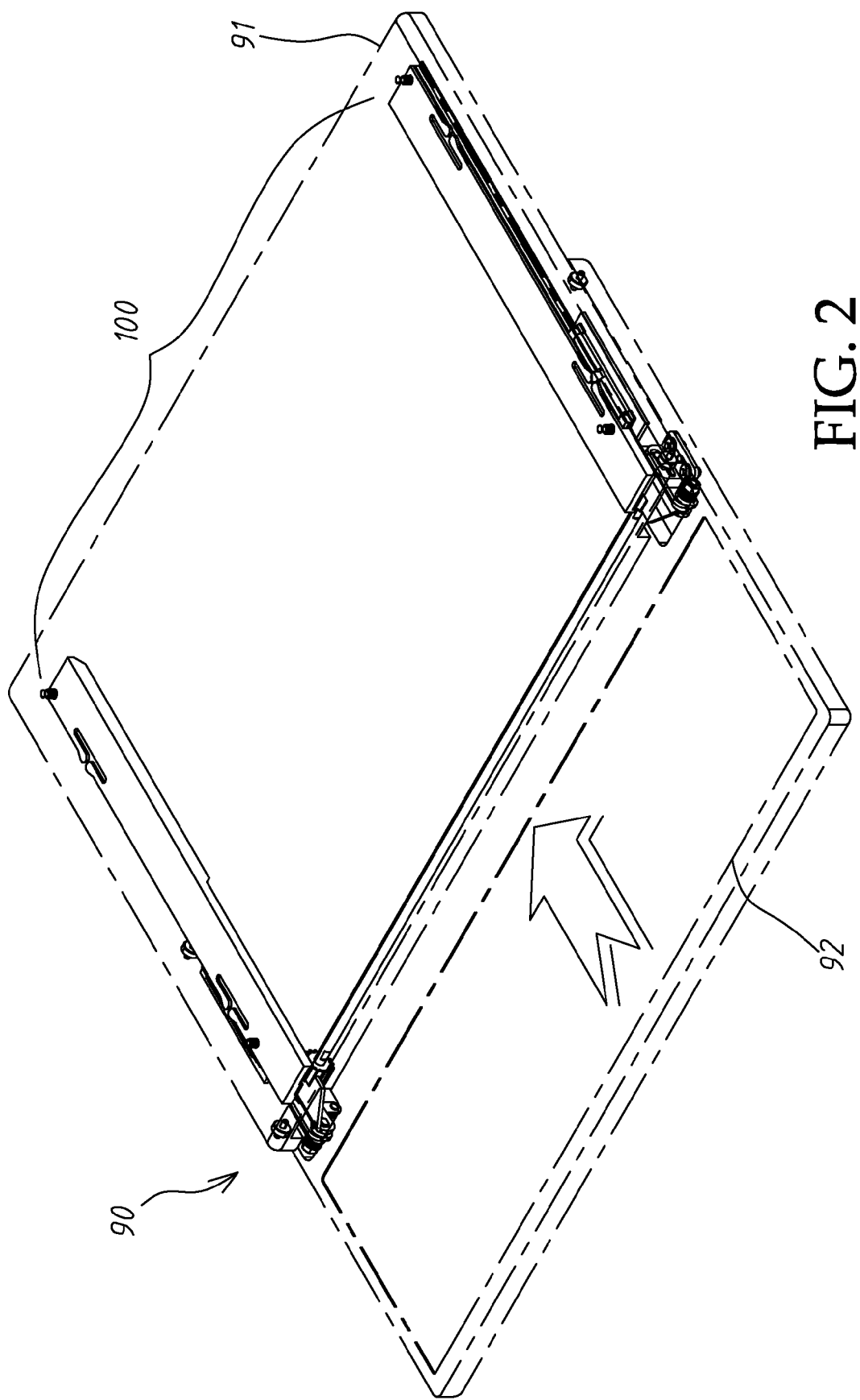
FIG. 2 corresponds to FIG. 1, illustrating the cover panel moved horizontally relative to the base member.
Figure 3:
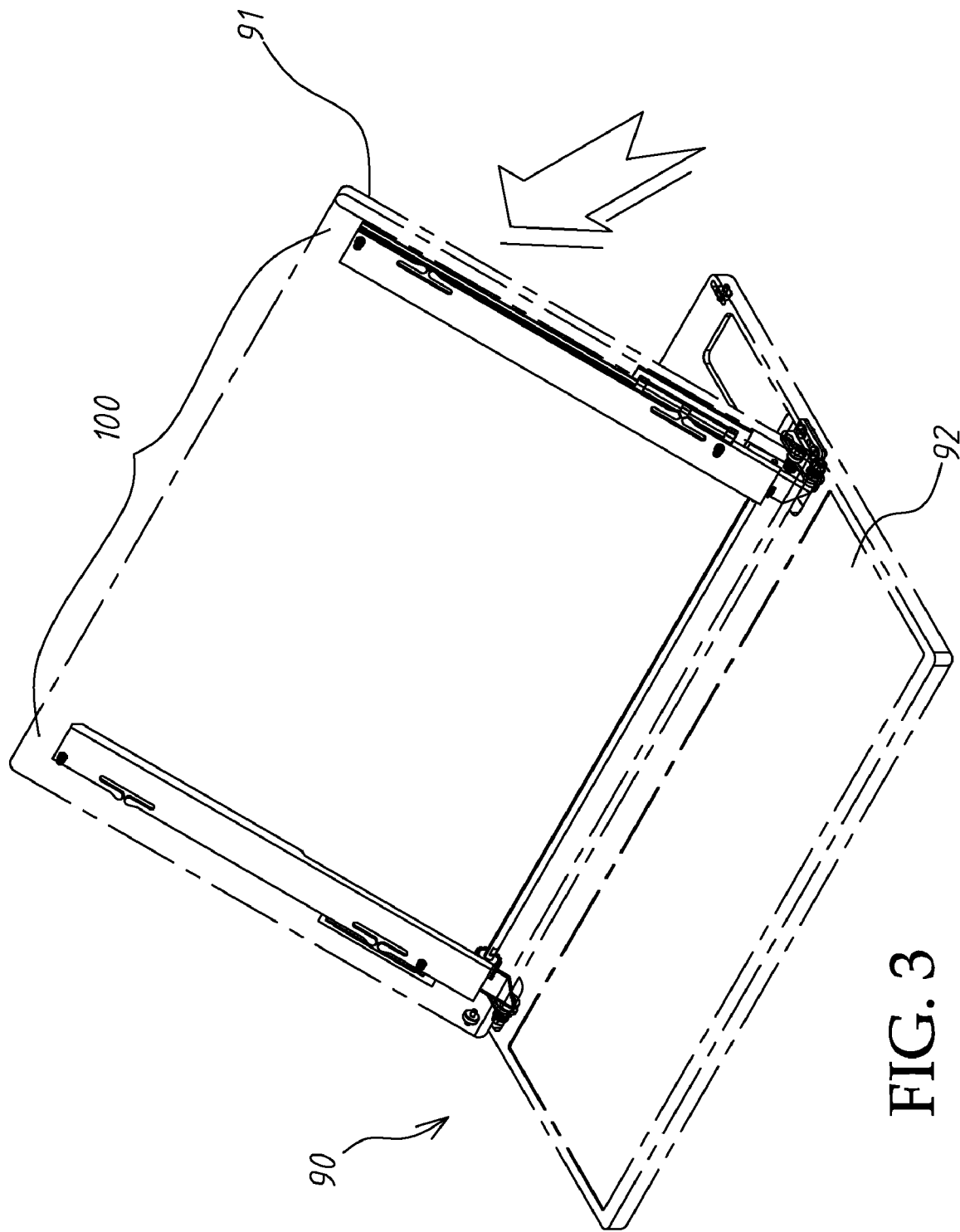
FIG. 3 corresponds to FIG. 2, illustrating the cover panel turned upwards relative to the base member.

Referring to FIGS. 1~3, a liftable slide cover mounting structure 100 in accordance with the present invention is shown used in an electronic device 90 comprising a cover panel 91 and a base member 92. The electronic device 90 can be, for example, a tablet computer. The cover panel 91 is a LCD display panel. The base member 92 is the operating system end of the electronic device 90, comprising a keyboard. When going to open the cover panel 91, slide the cover panel 91 on the base member 92 (see FIG. 2) and then lift the cover panel 91 from the base member 92 to a tilted position (see FIG. 3).

Figure 4:
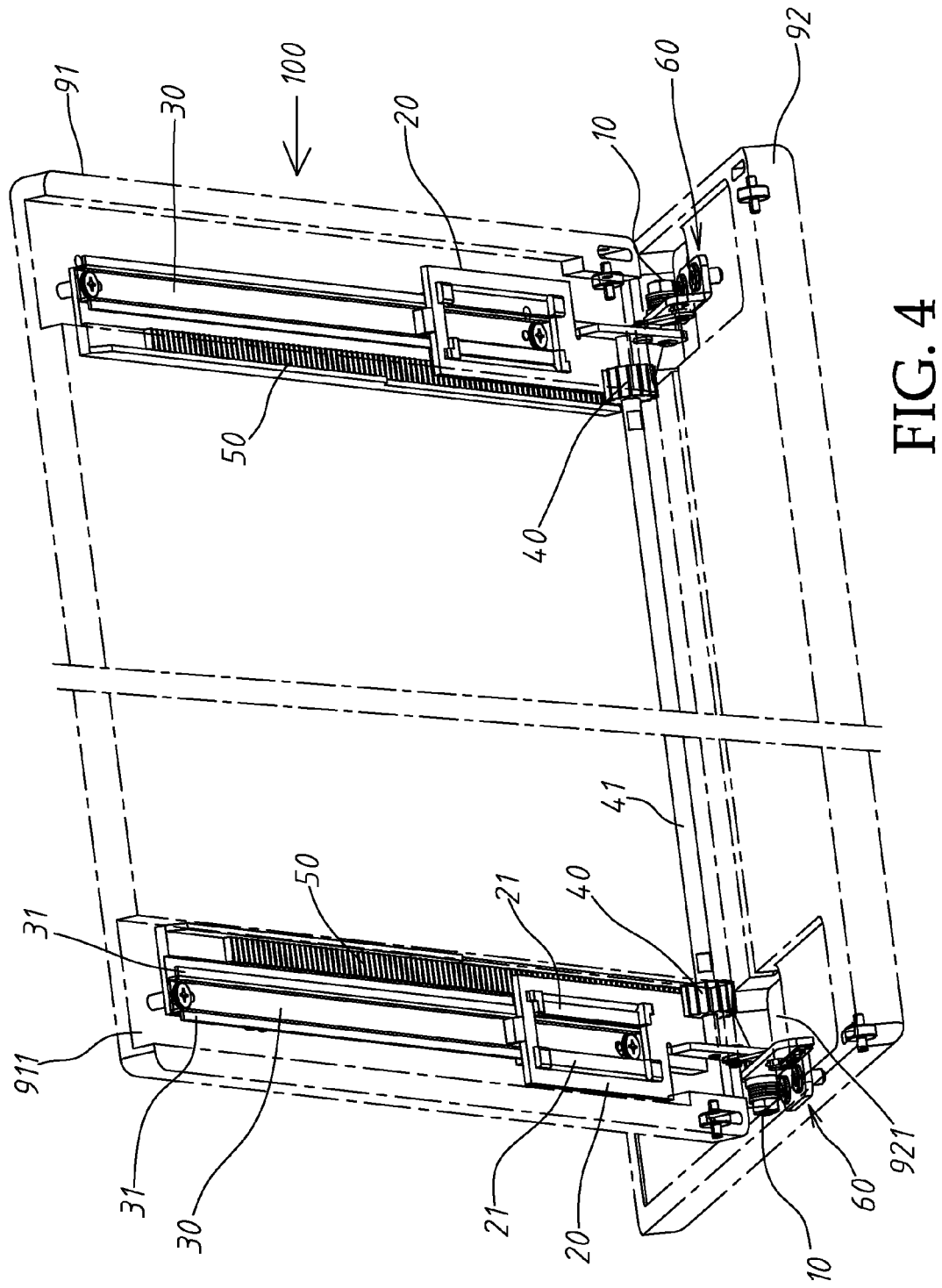
FIG. 4 is a perspective view of the liftable slide cover mounting structure in accordance with the present invention.

Referring to FIG. 4, the liftable slide cover mounting structure 100 comprises a pair hinges 10, a pair of sheet plate bracket mechanisms 20, a pair of sliding rails 30, a pair of gears 40, a pair of gear racks 50 and a pair of supplementary support mechanisms 60.

Figure 5:
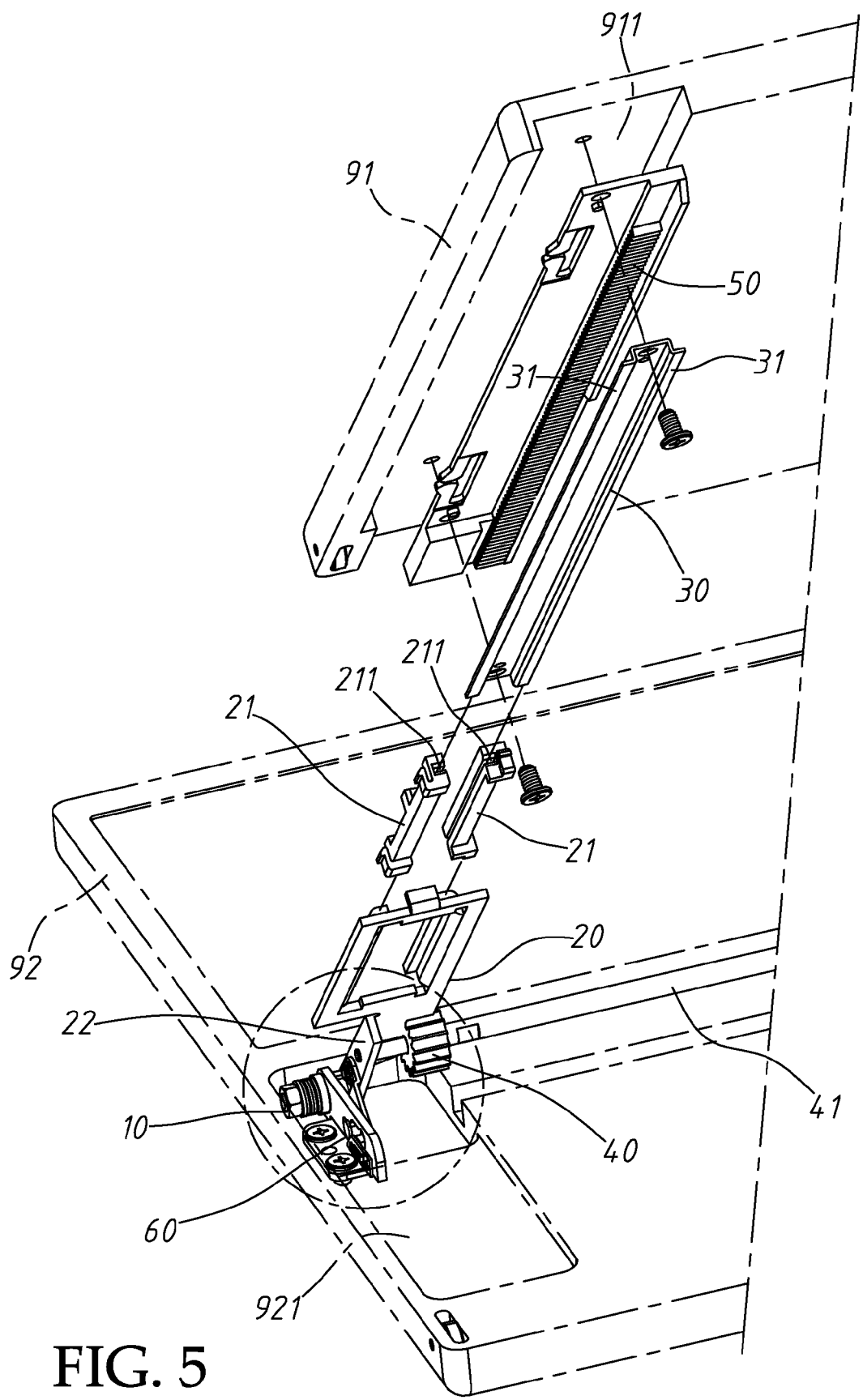
FIG. 5 is an exploded view in an enlarged scale of a part of liftable slide cover mounting structure shown in FIG. 4.

Referring also to FIG. 5, the hinges 10 are respectively arranged on the supplementary support mechanisms 60 and respectively affixed to one respective recessed portion 921 on the middle of the top wall of the base member 92 adjacent to the two opposite lateral sides of the base member 92, each comprising a rotatable pivot shaft.

The sheet plate bracket mechanisms 20 are respectively connected to the pivot shafts of the hinges 10 and rotatable upwardly relative to the base member 92, each having a bottom panel 22 thereof fixedly fastened to the pivot shaft of one of the hinges 10 for rotation with the respective pivot shaft and then positioned at the desired angle. Further, each sheet plate bracket mechanism 20 supports a pair of elongated plastic sliding blocks 21. Each elongated plastic sliding block 21 defines a longitudinal sliding groove 211.

The sliding rails 30 are respectively mounted in one respective recessed portion 911 on the bottom surface of the cover panel 91 in a parallel manner, each having two opposite side flanges 31 extending along the length thereof and respectively slidably coupled to the longitudinal sliding grooves 211 of the elongated plastic sliding blocks 21 on one respective sheet plate bracket mechanism 20.

The gears 40 are mounted on a common gear shaft 41, which has two distal ends thereof respectively pivotally connected between the bottom panels 22 of the sheet plate bracket mechanisms 20.

The gear racks 50 are respectively set in the recessed portions 911 on the bottom surface of the cover panel 91 in a parallel manner relative to the sliding rails 30, and respectively meshed with the gears 40.

As stated above, the liftable slide cover mounting structure 100 is used in an electronic device 90. When the cover panel 91 receives a horizontal push force, it will slide forwards relative to the base member 92. At this time, the sliding rails 30 will be moved in the longitudinal sliding grooves 211 of the elongated plastic sliding blocks 21 on one respective sheet plate bracket mechanism 20, and at the same time, the gear racks 50 will be forced to rotate the gears 40, enabling the horizontal push force to be evenly transferred through the gear shaft 41 to the two opposite lateral sides of the base member 92, avoiding biasing of the cover panel 91 during its sliding movement.

Figure 6:
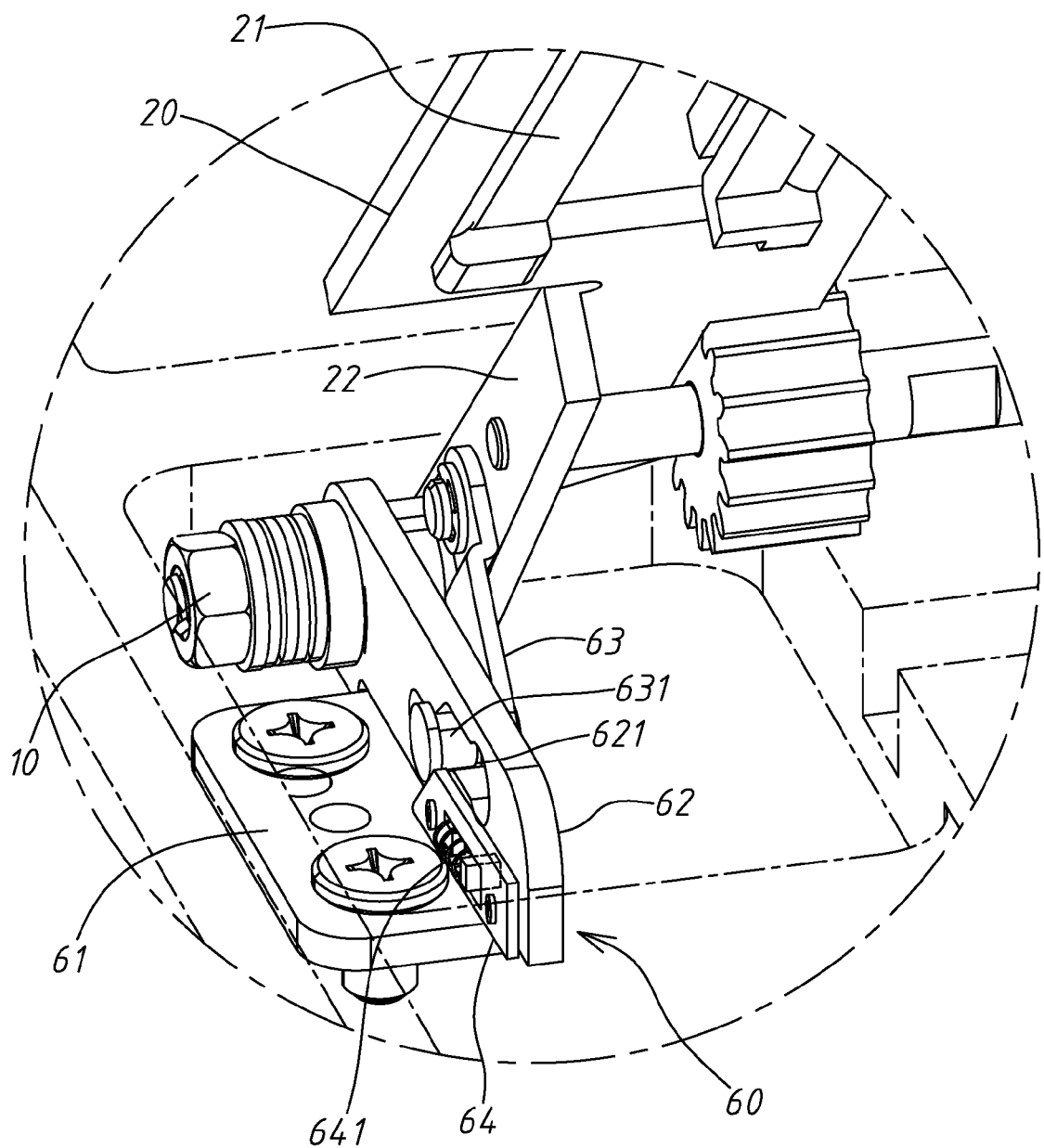
FIG. 6 is an elevational view in an enlarged scale of a part of the present invention, illustrating the arrangement of the supplementary support mechanism in the liftable slide cover mounting structure.

Referring to FIG. 6, each supplementary support mechanism 60 comprises a horizontal plate 61, a vertical plate 62, a brace 63 and an elastic plate 64. The horizontal plate 61 is affixed to the base member 92. The horizontal plate 61 and the vertical plate 62 are fixedly connected together at right angles. The vertical plate 62 is connected with one respective hinge 10, defining therein a curved sliding slot 621. The brace 63 has its one end pivotally connected to the bottom panel 22 of one respective sheet plate bracket mechanism 20, and its opposite end provided with an axle 631 that is inserted into the curved sliding slot 621. The elastic plate 64 holds therein a spring member 641 adapted for providing a spring force.

Figure 7:
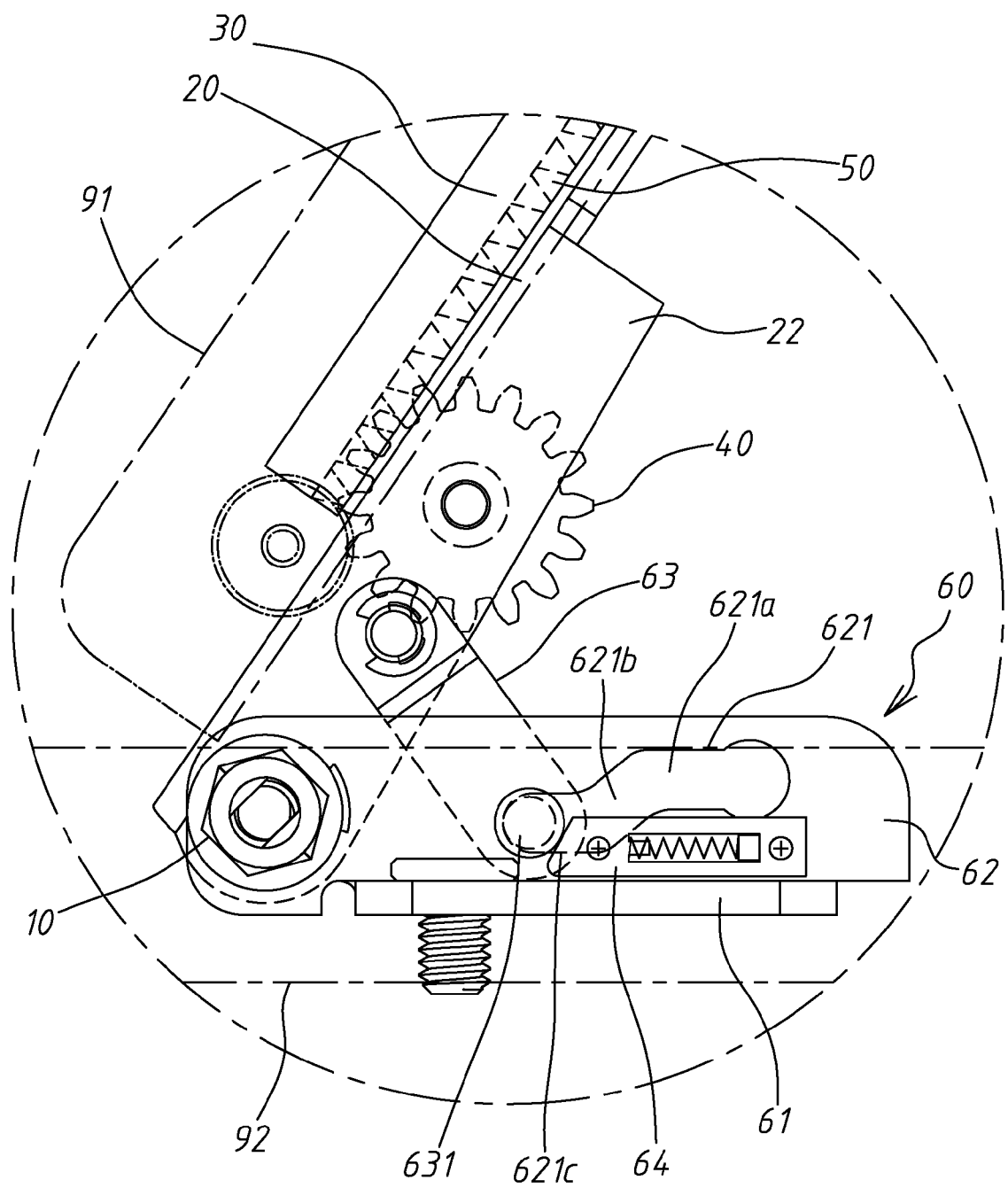
FIGS. 7~9 are schematic drawings of the present invention, illustrating the operation of the supplementary support mechanism.

Referring to FIG. 7, the curved sliding slot 621 comprises an upper horizontal sliding slot portion 621a, a lower horizontal sliding slot portion 621c and a sloping sliding slot portion 621b in communication between one end of the upper horizontal sliding slot portion 621a and one end of the lower horizontal sliding slot portion 621c. When the cover panel 91 is opened from the base member 92 and biased to the maximum angle position, the elastic plate 64 forces the axle 631 of the brace 63 to the distal end of the lower horizontal sliding slot portion 621c remote from the sloping sliding slot portion 621b, avoiding sliding. At this time, the user can touch the display screen of the cover panel 91 to operate the electronic device 90 without causing the cover panel 91 to fall down.

Figure 8:
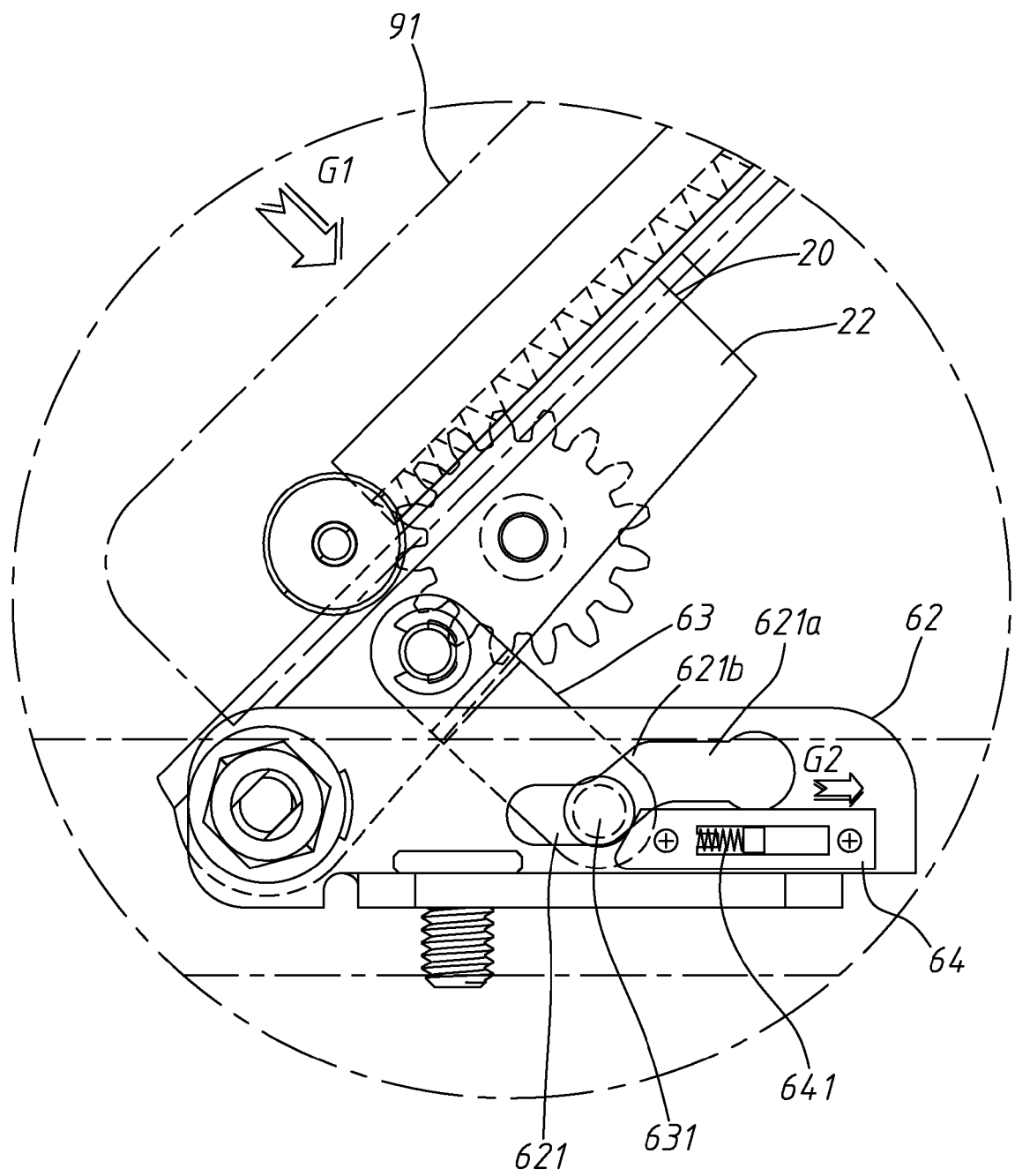
Figure 9:
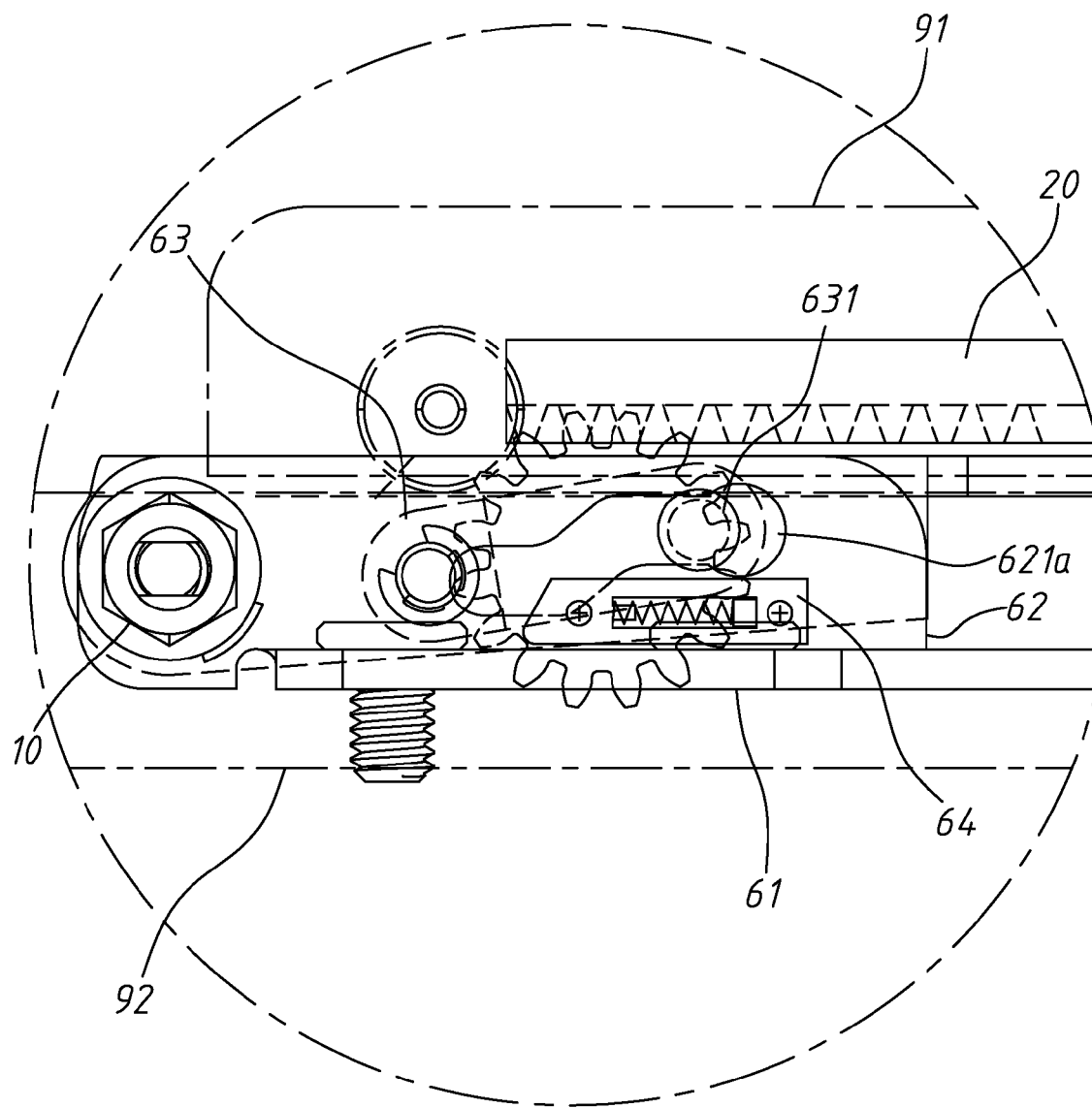

When going to close the cover panel 91 on the base member 92, as shown in FIG. 8, apply a downward pressure G1 to the cover panel 91 to force the axle 631 of the brace 63 against the elastic plate 64, as indicated by the arrowhead sign G2, thereby compressing the spring member 641. When continuously increasing the downward pressure G1 at this time, the axle 631 will be moved into the sloping sliding slot portion 621b. After the axle 631 entered the sloping sliding slot portion 621b, the spring force from the spring member 641 of the elastic plate 64 pushes the axle 631 upwardly along the sloping sliding slot portion 621b into the upper horizontal sliding slot portion 621a. At this time, the closing pressure from the cover panel 91 forces the axle 631 to move to the distal end of the upper horizontal sliding slot portion 621a, as shown in FIG. 9, and therefore the cover panel 91 is closed on the base member 92.

In conclusion, the invention provides a liftable slide cover mounting structure using a sheet metal bracket mechanism, which has the advantages as follows:

1. Subject to the use of the sheet plate bracket mechanisms 20 to hold the sliding rails 30 instead of the zinc alloy sliding rail holders of the prior art design, the weight of the liftable slide cover mounting structure is minimized. Further, subject to the arrangement of the elongated plastic sliding blocks 21 on the sheet plate bracket mechanisms 20 to support the metal sliding rails 30, sliding the metal sliding rails 30 does not cause noises.

2. The common gear shaft 41 of the gears 40 is pivotally connected between the bottom panels 22 of the sheet plate bracket mechanisms 20. When opening the cover panel 91 from the base member 92, the gears 40 are constantly kept in mesh with the gear racks 50, enabling the applied force to be distributed to the two opposite lateral sides evenly, avoiding biasing and assuring smooth movement of the cover panel 91 relative to the base member 92.

3. The supplementary support mechanisms 60 are respectively disposed adjacent to the hinges 10 at one side. When the cover panel 91 is opened from the base member 92, the sheet plate bracket mechanisms 20 are forced into engagement with the supplementary support mechanisms 60 to support the cover panel 91 in position for enabling the user to operate the display screen of the cover panel 91 positively.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A liftable slide cover mounting structure used in an electronic device comprising a cover panel and a base member, the liftable slide cover mounting structure comprising:

two hinges respectively fixedly mounted on a middle part of a top wall of said base member adjacent to two opposite lateral sides thereof, each said hinge comprising a rotatable pivot shaft;

two sheet plate bracket mechanisms respectively connected to the pivot shafts of said hinges and rotatable upwardly relative to said base member, each said sheet plate bracket mechanism comprising a pair of elongated plastic sliding blocks, each said elongated plastic sliding block defining a longitudinal sliding groove;

two sliding rails bilaterally fixedly mounted on a bottom surface of said cover panel in a parallel manner and respectively slidably coupled to the longitudinal sliding grooves of the elongated plastic sliding blocks of one said sheet plate bracket mechanism;

a gear shaft pivotally connected between said sheet plate bracket mechanisms;

two gears respectively fixedly mounted on said fixed gear shaft adjacent to said sheet plate bracket mechanisms; and two gear racks respectively mounted on the bottom surface of said cover panel in a parallel manner and respectively meshed with said gears;

wherein when said cover panel slides forwards relative to said base member to move said sliding rails in the longitudinal sliding grooves of said elongated plastic sliding blocks of said sheet plate bracket mechanisms when receiving a horizontal push force, and at the same time, said gear racks are forced to rotate said gears for enabling the received horizontal push force to be evenly transferred through said gear shafts to the two opposite lateral sides of said base member, avoiding uneven biasing of said cover panel; said gears are kept meshed with said gear racks constantly for enabling said cover panel to be turned about the pivot shafts of said hinges from a horizontal position to a tilted position relative to said base member.

2. The liftable slide cover mounting structure as claimed in claim 1, wherein each said sheet plate bracket mechanism comprises a bottom panel fixedly connected to the pivot shaft of one said hinge for synchronous rotation with the pivot shaft.

3. The liftable slide cover mounting structure as claimed in claim 2, further comprising two supplementary support mechanisms mounted on said base member to support said hinges on said base member and adapted for engaging said sheet plate bracket mechanisms to hold said cover panel in a tilted position when said cover panel is opened from said base member.

4. The liftable slide cover mounting structure as claimed in claim 3, wherein each said supplementary support mechanism comprises:

a horizontal plate;

a vertical plate fixedly connected with said horizontal plate at right angles, said vertical plate defining therein a curved sliding slot;

a brace having one end thereof pivotally connected to the bottom panel of one said sheet plate bracket mechanism and an opposite end provided with an axle that is inserted into the curved sliding slot of said vertical plate; and an elastic plate holding therein a spring member adapted for providing a spring force to force said axle of said brace to one end of said curved sliding slot and into engagement with one said metal sheet bracket mechanism when said cover panel is opened from said base member to a maximum angle.

5. The liftable slide cover mounting structure as claimed in claim 4, wherein said curved sliding slot comprises an upper horizontal sliding slot portion, a lower horizontal sliding slot portion and a sloping sliding slot portion in communication between one end of said upper horizontal sliding slot portion and one end of said lower horizontal sliding slot portion; when said cover panel is opened from said base member and biased to the maximum angle position, said elastic plate forces the axle of said brace to one end of said lower horizontal sliding slot portion remote from said sloping sliding slot portion; when closing said cover panel on said base member, the axle of said brace is forced by said cover panel against said elastic plate to compress said spring member and to move into said sloping sliding slot portion and then to be pushed by said spring member of said elastic plate upwardly along said sloping sliding slot portion into said upper horizontal sliding slot portion to the distal end of said upper horizontal sliding slot portion remote from said sloping sliding slot portion, and therefore said cover panel is closed on said base member.

* * * * *